United States Patent
Hoomani et al.

(10) Patent No.: US 9,509,521 B2
(45) Date of Patent: Nov. 29, 2016

(54) CONTEXTUAL CHAT BASED ON BEHAVIOR AND USAGE

(75) Inventors: Cyrus J. Hoomani, Studio City, CA (US); Vita Markman, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1461 days.

(21) Appl. No.: 12/871,752

(22) Filed: Aug. 30, 2010

(65) Prior Publication Data

US 2012/0054645 A1  Mar. 1, 2012

(51) Int. Cl.
| | |
|---|---|
| *H04N 7/173* | (2011.01) |
| *G06F 15/16* | (2006.01) |
| *H04M 1/64* | (2006.01) |
| *H04L 12/18* | (2006.01) |
| *G06F 17/28* | (2006.01) |
| *H04L 12/58* | (2006.01) |
| *G06Q 10/10* | (2012.01) |
| *G06Q 50/00* | (2012.01) |

(52) U.S. Cl.
CPC ......... *H04L 12/1813* (2013.01); *G06F 17/289* (2013.01); *G06F 17/2836* (2013.01); *G06Q 10/10* (2013.01); *G06Q 50/01* (2013.01); *H04L 12/583* (2013.01); *H04L 51/063* (2013.01); *A63F 2300/572* (2013.01)

(58) Field of Classification Search
USPC .............. 715/758, 738; 704/277, 3; 709/206
See application file for complete search history.

(56) References Cited

U.S. PATENT DOCUMENTS

2001/0029455 A1* 10/2001 Chin et al. .................... 704/277
2002/0049805 A1*  4/2002 Yamada et al. ............... 709/202

(Continued)

FOREIGN PATENT DOCUMENTS

WO      02070088 A1    9/2002
WO   2008109680 A1    9/2008

OTHER PUBLICATIONS

Boehret, Katherine; The Mossberg Solution: Rating the New Instant-Messaging Programs; Feb 7, 2007; Wall Street Journal; Eastern edition; New York, N. Y. (0099-9660). p.D.1.*

(Continued)

*Primary Examiner* — Jordany Nunez
(74) *Attorney, Agent, or Firm* — Patterson + Sheridan, LLP

(57) ABSTRACT

Techniques are disclosed for providing an enhanced contextual chat feature in online environments. The contextual chat feature may be used to present users with a list of expressions that may be sent to other users within an online environment (or to users in other online environments). The list of messages may be derived from a linguistic profile which itself may change as the use of language in an online environment (or by a particular user group) evolves, over time. In cases where a user sends a contextual chat message to another user in the same online environment, messages may be sent without being altered. However, when a user selects a contextual chat message from the list to send to a user in another online environment, the message may be translated based on a linguistic profile associated with users in the second environment.

22 Claims, 12 Drawing Sheets

(56) References Cited

U.S. PATENT DOCUMENTS

| | | |
|---|---|---|
| 2002/0059379 A1 | 5/2002 | Harvey et al. |
| 2002/0140726 A1* | 10/2002 | Schwartz et al. ............ 345/738 |
| 2003/0097406 A1* | 5/2003 | Stafford ..................... 709/204 |
| 2004/0078192 A1* | 4/2004 | Poltorak ............ G06F 17/2715 704/9 |
| 2006/0003838 A1 | 1/2006 | Kobayashi et al. |
| 2006/0129633 A1* | 6/2006 | Potluri et al. ................. 709/203 |
| 2008/0147408 A1* | 6/2008 | Da Palma ............... G10L 15/22 704/270.1 |
| 2008/0288241 A1* | 11/2008 | Noda ............................ 704/4 |
| 2009/0210803 A1* | 8/2009 | Brignull et al. ............... 715/757 |
| 2009/0253513 A1 | 10/2009 | Ducheneaut et al. |
| 2009/0299960 A1 | 12/2009 | Lineberger |
| 2010/0169769 A1* | 7/2010 | Jimenez et al. ............... 715/259 |

OTHER PUBLICATIONS

International Search Report and Written Opinion of the International Search Authority for PCT/US2011/049708 dated Nov. 30, 2011.

* cited by examiner

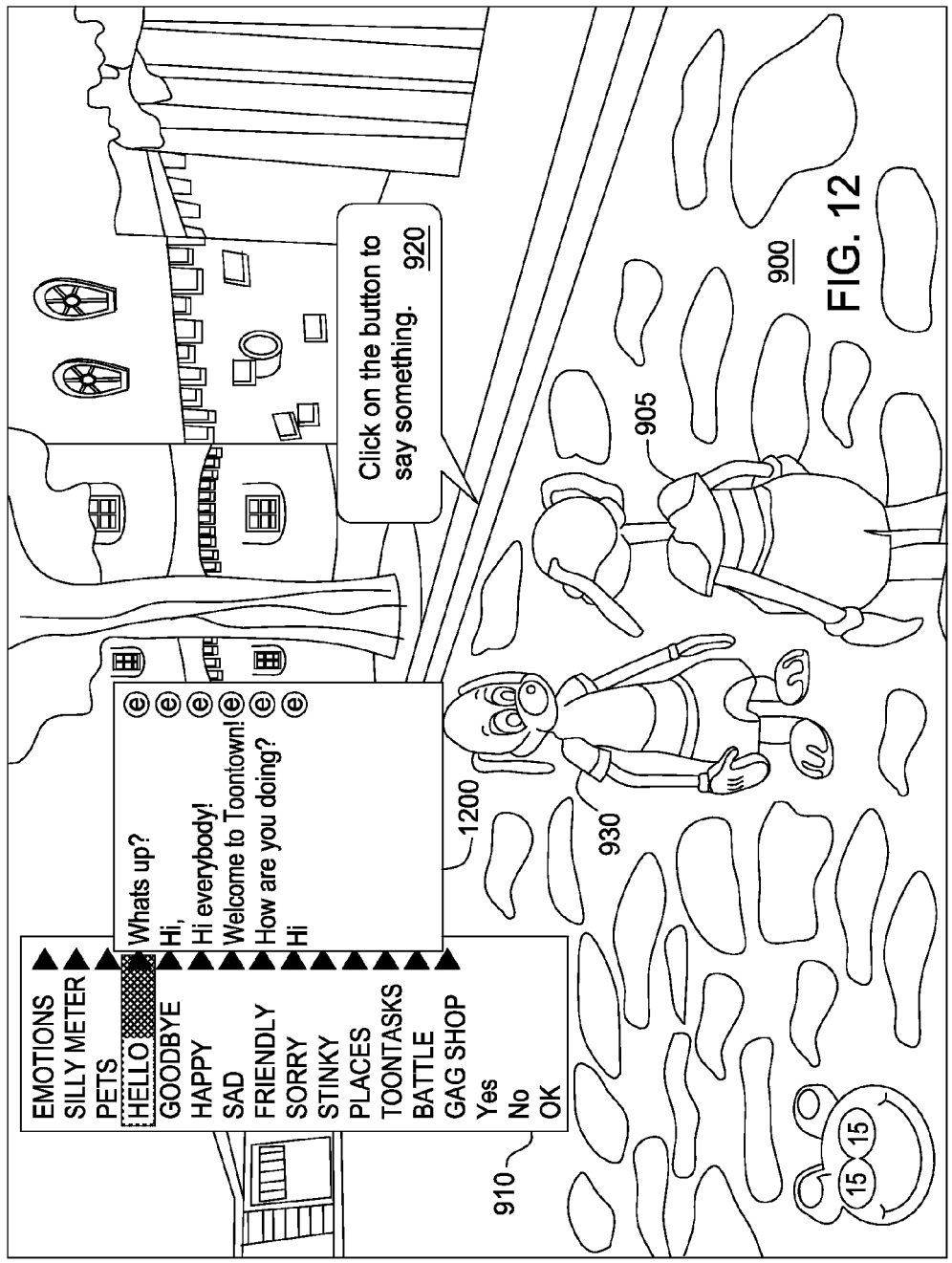

CONTEXTUAL CHAT BASED ON BEHAVIOR AND USAGE

BACKGROUND

1. Field

The invention is directed to computer-based online communication, and in particular, to chat messages exchanged between users in online gaming and social environments.

2. Description of the Related Art

Multiplayer online games and virtual worlds are popular forms of online entertainment. Both generally include computer users simultaneously logging into a computer network and interacting with each other in a computer simulated environment. The computer users are generally represented by a virtual avatar. Each computer user may control their avatar to move through the simulated environment, achieve gaming objectives and/or chat with other users and/or non-player characters.

User-to-user communication is generally a prominent feature within any online environment. To promote civility and safety among users, online environment providers generally employ safety or filtering features which reduce obscene language or other inappropriate communication. For example, in some formats, a user may chat directly with another user in real-time by typing characters directly into a text-field and sending a message to the other user. In this case, an online environment provider may process and filter user-to-user chat messages by removing swear words, slurs, or other known terms of disparagement. In another example, an online environment provider may disallow freely typed chat messages. Instead, a process is provided where a pre-selected choice of words or phrases is provided for a user to select and communicate other users. One constraint of such a system is that any words or phrases to be used must be manually predetermined by the online environment provider.

Another concern for online environment providers is community cohesion. Online environments may have many users with a variety of interests from a wide range of demographics. User communities may form which, in turn, may develop their own jargon, slang and/or abbreviations (e.g., "LOL"). To improve user experience and to provide a connecting experience to a variety of user demographics, online environment providers may provide methods to facilitate communication between users in disparate communities.

SUMMARY

One embodiment of the invention provides a computer implemented method for providing a chat program in an online virtual world environment. The method generally includes generating a user profile based on a pattern of user behavior within the online virtual world environment, assigning the user profile to a user, generating a linguistic profile corresponding to the user profile, and modifying communication of the user based on the linguistic profile.

Another embodiment of the invention includes a computer-implemented method for providing a chat feature in an online virtual environment. This method may include receiving a selection from a first user of an entry form a first list of predetermined expressions (based on a first linguistic profile) and an indication of a second user as a chat message recipient. Upon determining the first and second users are associated with a common user profile, the selected entry may be transmitted to the second user as a chat message. Otherwise, upon determining the first and second user are associated with different user profiles, a corresponding entry in a second list of expressions may be determined, the second list of expressions is based on a second linguistic profile. Additionally, the corresponding entry may be transmitted to the second user as a contextual chat message.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

FIG. 12 illustrates the online environment 900 of FIG. 9 where a user is presented with contextual chat messages based on matching a group profile, according to one embodiment of the invention.

DETAILED DESCRIPTION OF THE PREFERRED EMBODIMENTS

Figure 1:
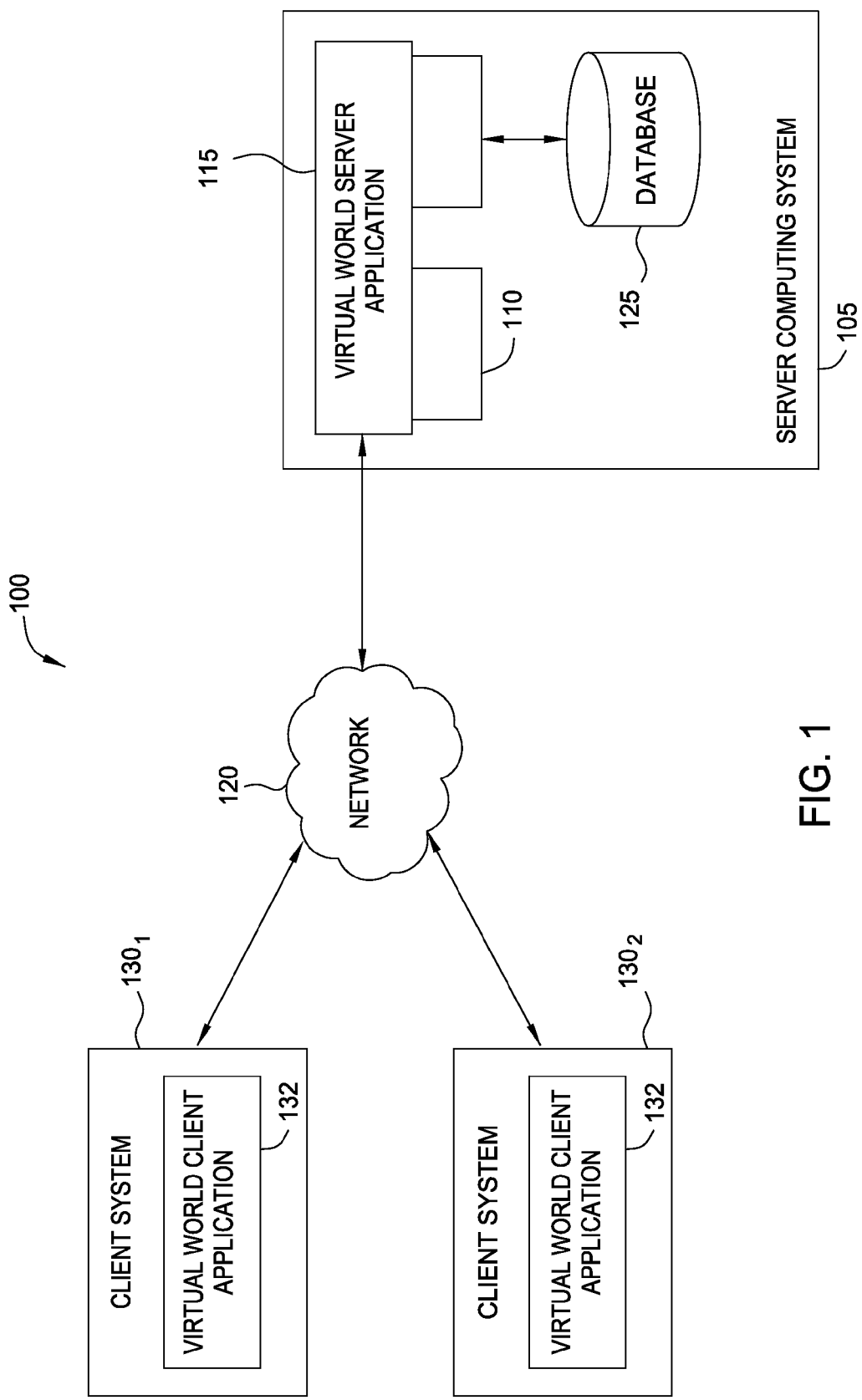
FIG. 1 illustrates a computing infrastructure configured according to one embodiment of the invention.

Embodiments of the invention provide techniques for providing users with a contextual safe chat environment that is based on a user's behavior and prevailing usage patterns in the virtual environment. In particular, a chat system may provide targeted words or phrases that match a user's vocabulary and sentence structure, while still providing a safe chatting environment. This approach may include capturing a user's usage behavior (e.g., preference in playing a type of game, length and quantity or quality of user-to-user interactions, chat verbosity, etc.) and assigning the user a user profile based on the captured usage behavior. This approach further includes generating a linguistic profile for each user profile based on a linguistic analysis of users associated with a given user profile.

For example, studying the general user profile and patterns within an online environment may reveal that players tend to speak in abbreviations (e.g., "LOL," "BTW," "AFK") and that the abbreviations are used infrequently in the other portions of the online environment. In such a case, users in other online environments may lack familiarity with the abbreviations. Similarly, users who employ a given abbreviation may not be aware they are not being understood by a chat partner. As such, resolving this breakdown in communication improves the user experience and community cohesion within the online environment.

In one embodiment, a chat system may generate user profiles based on general behavior and patterns of usage observed within the online environment. Users may be assigned a user profile based on their behavior and patterns of usage. Alternatively, users may be assigned a profile based on their use of a given on-line service or environment, or may simply be self selected form a list set list of profiles. For example, users signing up for an online service that provides a multiplayer first person shooter gaming environment may be assigned one user profile, while users signing up for a social networking site that allows users to create an avatar representation of themselves and chat with other avatars may be assigned another user profile. As another example, users could select from a list identifying themselves as a "gamer."

In any case, a linguistic profile may be constructed for each user profile based, in aggregate, on the language choices, including abbreviations, acronyms, punctuation, grammar, and emoticons, of users assigned to that user profile. Further, the chat system may generate equivalences between terms, words, or phrases from one linguistic profile to the terms, word, or phrases from another linguistic profile. These equivalences may be stored for later retrieval. For example, when a user chats with another user, they may be provided a list of terms, words, and phrases selected for communication with the other user. The list may be tailored according to the linguistic profile assigned to the user. When the user selects a term, word or phrase, the chat system may determine the equivalent term, word, or phrase corresponding to the other user's chat profile and send that equivalent communication to the other user.

In addition (or as an alternative), the behavior of the character presenting the chat message may correspond to the message. For example, assume a first user selects to send a message of "LOL" to a second user. As noted, the contextual chat message may be translated to "laughing out loud" or "that makes me laugh" when sent to the second user. In addition, the avatar corresponding to the first user may be animated to appear to be laughing when the message is sent to the second user. Similarly, the chat message may be associated with audio. For example, the translation of a contextual chat message could be played audibly for the second user, e.g., a recording of a person saying the phrase "laughing out loud, or simply the sound of laughter. More generally, the behavior, appearance, actions, animations or sounds of an avatar in an interactive environment may be configured to correspond to or reinforce the content of the contextual chat message. Doing so may greatly enhance the communication between users as well as promote the use of contextual chat messages as a mechanism for users of interactive environments to communicate with one another.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As one skilled in the art will appreciate, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be used. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a computing infrastructure configured for contextual filtered chat based on behavior and usage, according to one embodiment of the invention. As shown, the computing infrastructure 100 includes a server computer system 105 and a plurality of client systems $130_{1-2}$, each connected to a communications network 120. The server computer 105 includes a virtual world application server 110 and a database 125.

In one embodiment, the computing infrastructure 100 may include existing computer systems, e.g., desktop computers, server computers, laptop computers, tablet computers and the like. The computing environment 100 illustrated in FIG. 1, however, is merely an example of one computing environment. Embodiments of the present invention may be implemented differently, regardless of whether the computer systems are complex multi-user computing systems, such as a cluster of individual computers connected by a high-speed network, single-user workstations or network appliances lacking non-volatile storage. Further, while FIG. 1 illustrates a client-server model, other models are contemplated such as a peer-to-peer model.

In one embodiment, each client system $130_{1-2}$ communicates over the network 120 to interact with a virtual world application provided by the server computer system 105. Each client $130_{1-2}$ may include a virtual world client used to create a connection with the server system 105 and to receive and render the virtual world online environment. For example, the virtual world application server 110 receives commands representing the actions of a connected client's virtual character or avatar and tracks the status and movement of each virtual character or avatar within the online environment. The virtual world application server 110 in turns sends updates to each connected client system $130_{1-2}$. Further, the virtual world application server 110 may assign a user profile to the connected client 130 and create and revise a linguistic profile based on behavior and communications of connected clients 130 having the same user profile.

Figure 2:
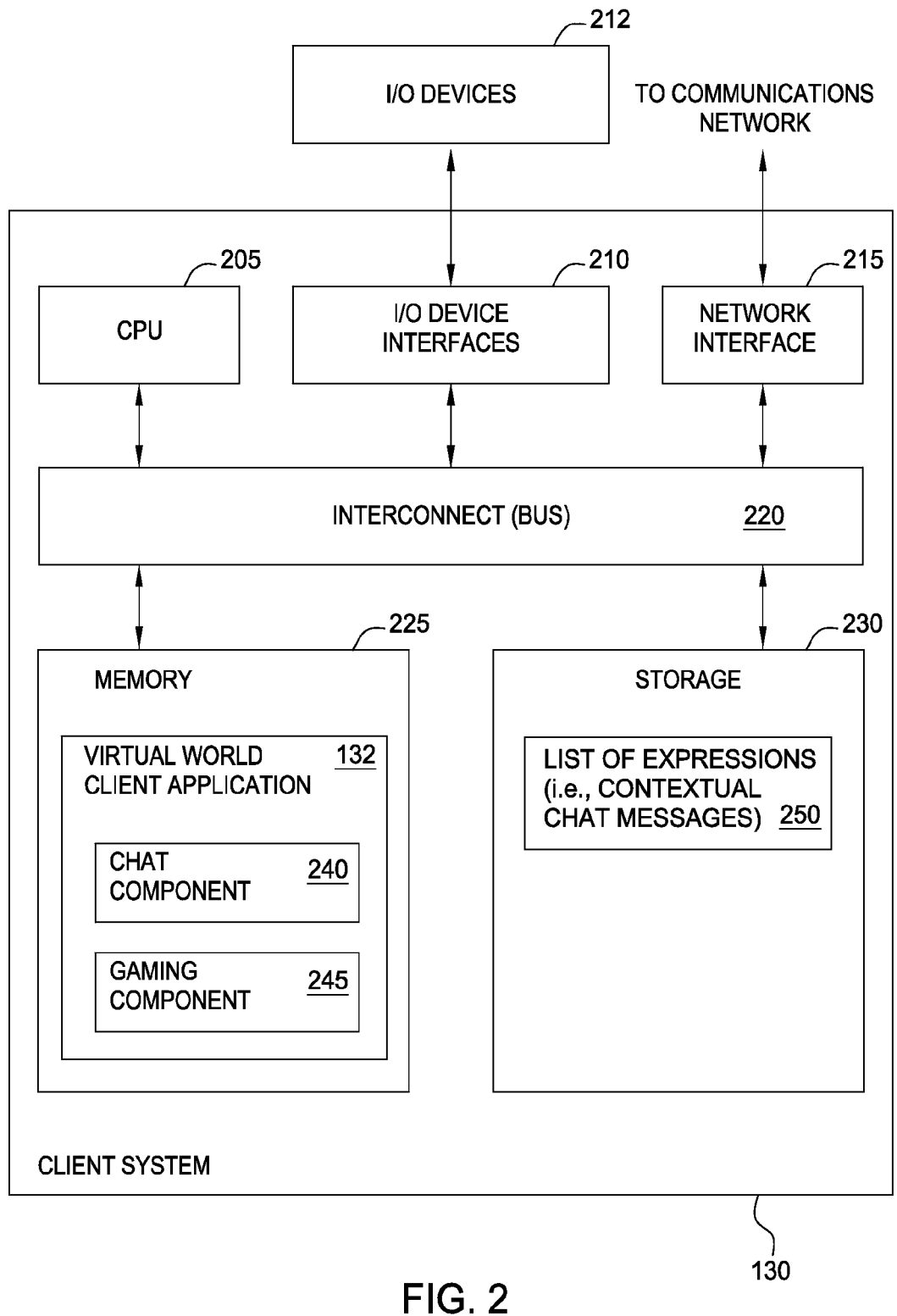
FIG. 2 is a more detailed view of the client computing system of FIG. 1, according to one embodiment of the invention.

FIG. 2 is a more detailed view of the client computing system 130 of FIG. 1, according to one embodiment of the invention. As shown, the client computing system 130 includes, without limitation, a central processing unit (CPU) 205, a network interface 215, an interconnect 220, a memory 225, and storage 230. The computing system 105 may also include an I/O devices interface 210 connecting I/O devices 212 (e.g., keyboard, display and mouse devices) to the computing system 105.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive or flash memory storage drive, may store non-volatile data.

Illustratively, the memory 225 includes a virtual world client application 235, which itself includes a chat component 240 and a gaming component 245, and the storage 230 stores a list of expressions 250. Using the I/O devices, the client computing system 130 may display a virtual world as instructed by the virtual world client application 235. The virtual world client application 235 renders a virtual world having virtual locations and virtual characters, including an avatar controlled by the user. For example, the client application may display a three-dimensional map, representing the virtual world and numerous characters through the map, representing both avatars controlled by other users in the online environment and non-player characters. The virtual world client application 235 may also transmit user commands and updates to the virtual world server (discussed below) so as to notify the server of changes in position and/or action of the user's avatar.

In one embodiment, the chat component 240 provides user-to-user chat functions within the virtual world. The chat component 240 may be configured to transmit and receive chat messages from the virtual world application server. The chat component 240 may store messages sent and received by the user as well as provide a chat history.

The chat component 240 may be configured to present a list of preselected terms, words, or phrases that one user may select to send as a chat message to another user (i.e., the list of expressions 250). The chat component 240 may tailor the list of terms, word, or phrases, based a linguistic profile generated for a given online environment (or users sharing a common user profile). In one embodiment, users registering for an online environment may be assigned a user profile that is representative of users in that online environment. For example, a first-person shooter game may have a number of leagues, where users are assigned to a given league based on their skill level at playing the game. In such a case, chat messages sent among users in a given league may be evaluated to derive a linguistic profile associated with that league (or more generally, with an online environment or a common user profile). As another example, users may have a profile assigned based on demographic characteristics to a survey of interests and preferences. Similarly, a user could also self-select a profile from a number of pre-defined profiles. Of course, other approaches for assigning users to a user profile may be used.

Chat messages sent among users associated with a given user profile may be used to generate a linguistic profile. The linguistic profile may indicate a frequency of use for terms in messages (or parts of messages) sent between users associated with a given user profile. In one embodiment, the linguistic profile itself may be used to generate the list of expressions 250 available to send to other users as chat messages via the chat component 240. For example, a predefined number of the most frequently used messages, expressions, terms, acronyms, phrases, idioms, and/or colloquialisms, etc., may be selected to include in the list of expressions 250. Of course, a variety of approaches may be used to generate the list of expressions 250. In addition, behavioral traits, actions, sounds, etc., may be associated some of the list of expressions 250.

Further, as the patterns or frequency of use of terms changes within an online environment (or for a group of users assigned a common profile), the corresponding linguistic profile may be updated. That is, the pre-selected terms presented to users within a given online environment may evolve for a given user group, as the use of language in that online environment (or by the particular user group) evolves, over time. Doing so allows the list of expressions 250 available to be sent as chat messages to remain contextually relevant as the vocabulary or jargon of a given user community changes over time. Further, mappings between the lists of expressions derived from different linguistic profiles may be created, allowing chat messages to be sent across different user communities or online environments.

The chat component 240 may receive an input indicating the user has selected a chat message for communication. In response, the chat component 240 transmits the selected message selected to the connected virtual world application server. In one embodiment, the chat component 240 (or application server or receiving client) may modify and/or translate the chat message selected by the user into an equivalent message, based on the linguistic profile of the receiving client as well as add audio or cause the sending character to engage in some behavior or action visible to the receiving client concurrent with sending the message.

The chat component 240 may also provide a free-form text field which allows the user to compose messages sent to other users. In such a case, the user may compose a chat message using combination any letters, characters or symbols to send to another user.

The gaming component 245 provides a user with a single- or multi-player gaming experience. The gaming component 245 may provide any variety of games to a user, including but not limited to action games, puzzle games, and word games. The games may be stored wholly locally within the client system 130 or may be hosted by a server computing system 105. The gaming component 245 may transmit gaming information and results to the connected virtual world server application.

The chat component 240 and gaming component 245 may also be interconnected. For example, the chat component 240 may permit a user to chat with another user in-game, while playing a game provided by the gaming component 245. In such a case, both users may be in a common gaming environment. However, the users may each be individually playing a given while chatting with one another using the chat component 240. In another embodiment, language information from the chat component 240 may be used to present in-game information to a user in the style of the language the user prefers. For example, where language information indicates that a user prefers to refer to kilometers a 'clicks,' the gaming component 245 may modify any distance information on a Heads-Up Displays (HUD) to display "clicks" instead of "kilometers." More generally, the chat component 240 may allow users to chat across different virtual environments. For example, a user playing an online first-person shooter game may chose a message from a list of pre-selected messages to send to friend who is present in a virtual world environment. Further, the message may be translated based on a linguistic profile associated with the first-person shooter environment and another linguistic profile associated with the virtual world environment.

Figure 3:
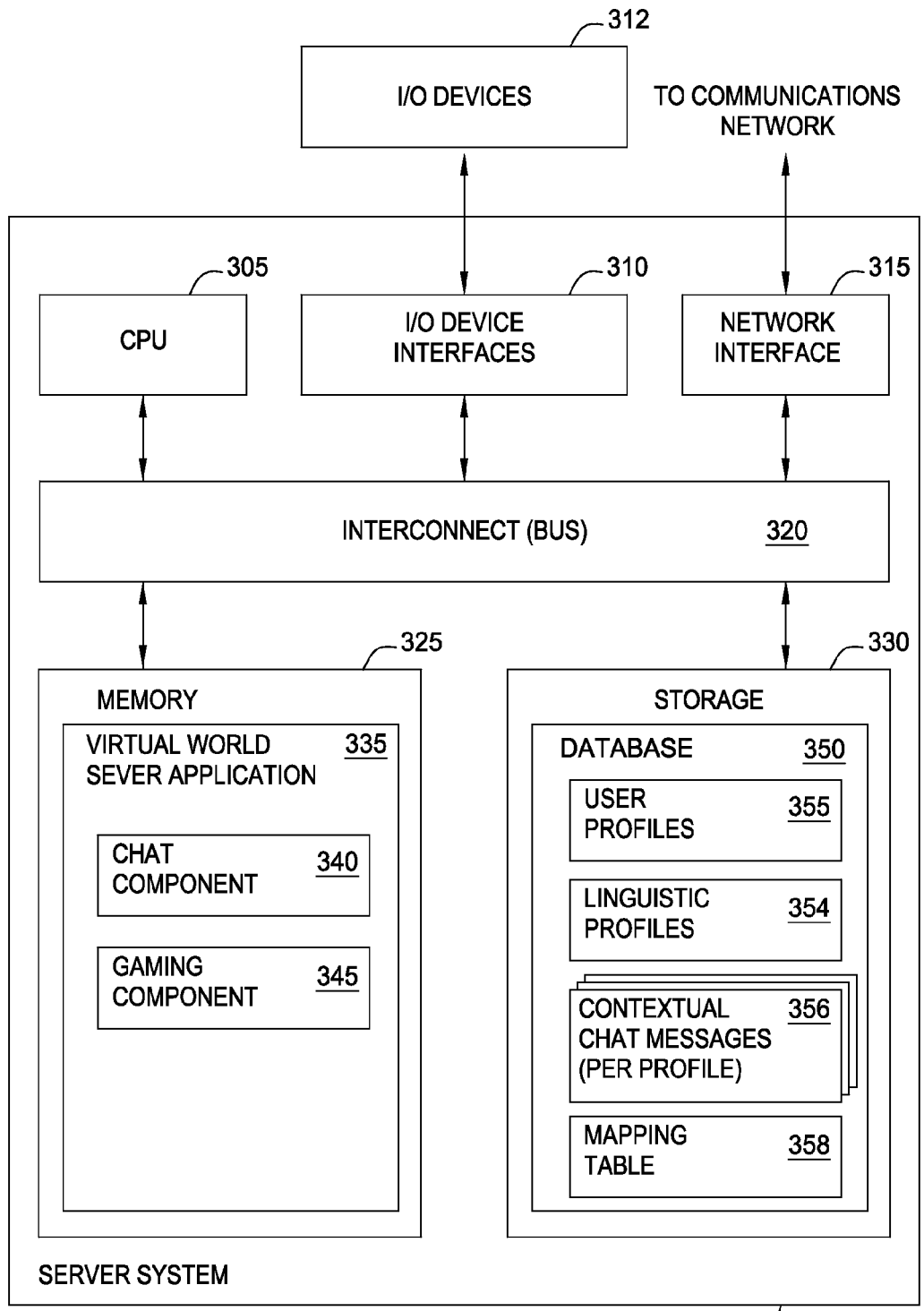
FIG. 3 is a more detailed view of the server computing system of FIG. 1, according to one embodiment of the invention.

FIG. 3 is a more detailed view of the server computing system 105 of FIG. 1, according to one embodiment of the invention. As shown, server computing system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, floppy disc drives, tape drives, removable memory cards, optical storage, network attached storage (NAS), or a storage area-network (SAN).

As shown, the memory 325 stores a virtual world server application 335, and the storage 330 includes a database 350 storing user profiles 352, linguistic profiles 354. And the virtual world server application 335 includes a chat component 340 and a gaming component 342. In one embodiment, virtual world server application 335 hosts an online gaming environment to which one or more of the client computing systems 130 connect. The virtual world server application 335 controls the online environment experience and sends updates to connected virtual world clients regarding the current state of the virtual world.

The chat component 340, as mentioned above, may be configured to store and relay chat messages between users. According to one aspect, the chat component 340 may provide a list of expressions derived from the linguistic profile of users in a given online community (or who share a common user profile). In one embodiment, the chat component 340 uses the linguistic profile 354 to generate a list of expressions (i.e., contextual chat messages 356) which users may exchange with one another a chat messages. The contextual chat message 356 may be generated for each of the linguistic profiles 354. For example, as noted above, a predefined number of the most frequently used messages, expressions, terms, acronyms, phrases, idioms, and/or colloquialisms, etc., may be selected to include in the list of expressions available for a user to select and send as a contextual chat message. In one embodiment, some items in the list of expressions may also be associated with audio, behavior, or other non-textual elements to present to a user receiving a given contextual text-message.

Figure 4:
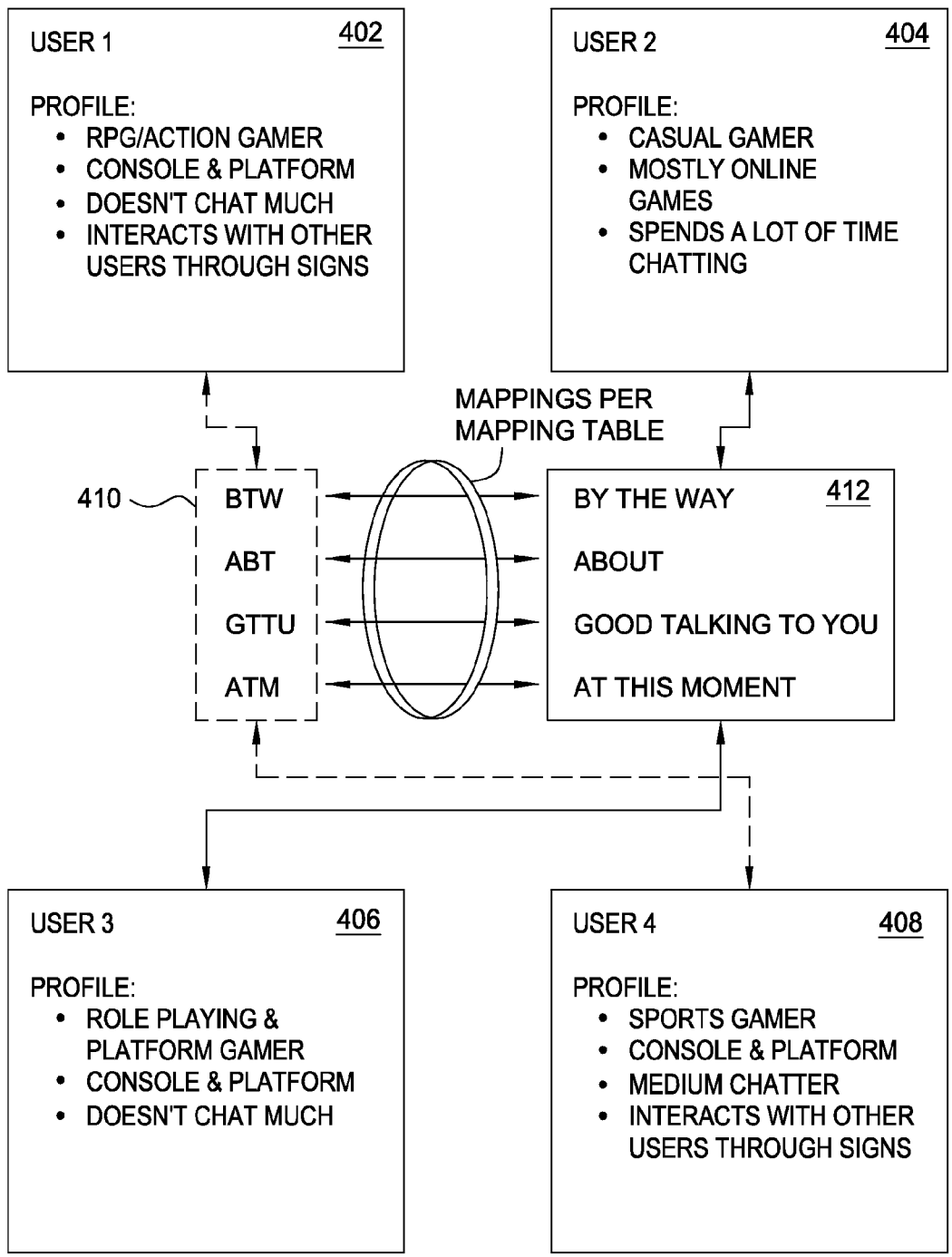
FIG. 4 is a block diagram illustrating an example set of user profiles, according to one embodiment of the invention.

FIG. 4 is a block diagram illustrating an example set of user profiles, according to one embodiment of the invention. More specifically, FIG. 4 illustrates four examples of user profiles 402, 404, 406 and 408 that may be assigned to users for different online environments. For example, User 1 has been assigned to a user profile 402 which represents a user known to prefer role-playing (RPG) and action games. User profile 402 generally represents users that access the virtual environments (or chat with other users) over a gaming console. User profile 402 indicates that users assigned to this profile do not chat much (relative to users in other profiles) and instead tend to interact with other users through avatar signs or visual indications. User 2 has been assigned user profile 404 which represents a casual gamer in this example. The casual gamer profile is used to represent users that typically prefer socially-oriented online games and spend much of their time chatting. User 3 is assigned user profile 406, which represents users known to prefer RPG and platform games. The profile indicates that users assigned to this profile do not chat much with other users. User 4 is assigned user profile 408, which represents a "sports" gamer in this example. The sports gamer profile represents users that typically prefer sports games, chat with other users in relatively moderate amounts (relative to users in other profiles), and also interact with other users through signs and other visual indications. As illustrated, attributes in user profiles may be shared by some users and may be unique to others. For example, Users 1 and 4 both interact with other users using signs or visual indications, but User 4 chats more often than User 1.

User profiles may include a number of attributes and factors. For example, user's preferences in gaming, or their gaming profile, may be considered. A gaming profile may include types of game play that a user prefers (e.g., fast-paced, slow), genres of games played (e.g., RPG, action, sports, puzzle, platforms), duration of play (e.g., by time, by frequency), and other attributes. A user profile may also include the language spoken by a user, duration of time spent and frequency of time in the online environment, and duration of time within a sub location within the online environment.

In the example illustrated in FIG. 4, user profiles 402 and 408 are associated with linguistic profile 410. In this example, linguistic profile 410 is characterized by the frequency of users to exchange chat messages using that frequently abbreviate certain terms, such as "BTW," "ABT," "GTTU" and "ATM." User profiles 404 and 406, in contrast, are associated with linguistic profile 412, which is characterized by the tendency of users to exchange chat messages using full expressions, such as "by the way" and "good talk to you."

In one embodiment, the linguistic profile may be used to create a list of expressions for users in an online community that may each be sent as chat messages other users within that community. Further, mapping an element in the list of expressions associated with one linguistic profile to a corresponding element in another profile allows users in different online environments to exchange contextually relevant chat messages between one another that can be understood by both a message sender and recipient.

Once generated, the linguistic profiles for multiple online environments (or user profiles) may be compared and key elements of the linguistic profiles may be selected as candidates for offering stylistic (or other) translations for chat messages exchanged between users in different online environments or associated with different user-profiles. For example, FIG. 4 illustrates a mapping between each expression in linguistic profile 410 with a corresponding expression in linguistic profile 412.

Figure 5:
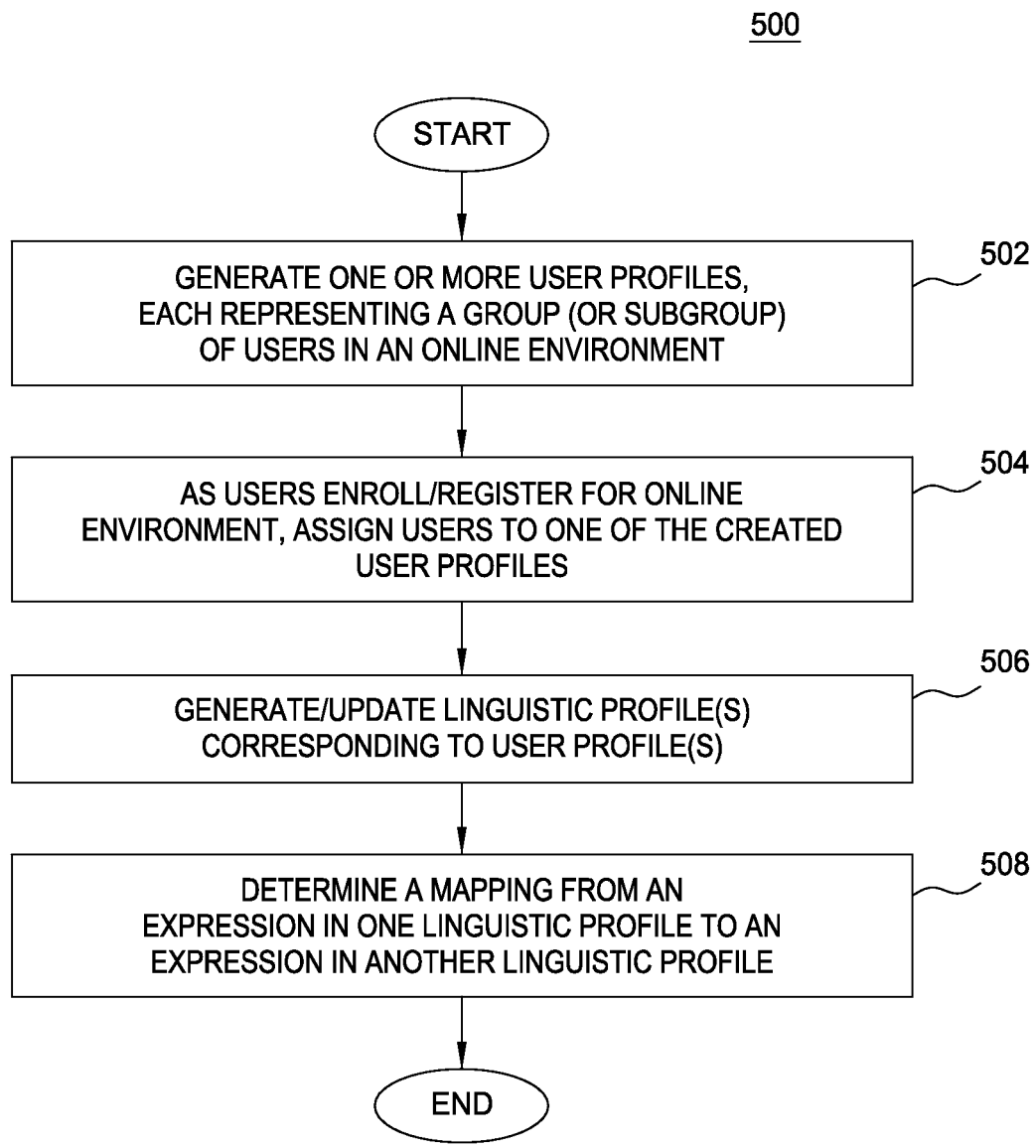
FIG. 5 illustrates a method for providing contextual chat to users of an online environment or community, according to one embodiment of the invention.

FIG. 5 illustrates a method 500 for providing contextual chat to users of an online environment or community, according to one embodiment of the invention. In one embodiment, the virtual world application server 335 may perform the method 500. As shown, the method 500 begins at step 502, where a virtual world application creates one or more user profiles, each representing a group (or subgroup) of users within an online environment. In one embodiment, the user profile may be created to represent users who meet certain criteria (e.g., having certain demographic characteristics) or who engage in certain behaviors or actions. For example, a user profile may represent users who enroll or register with a given online service. Thus, users who create an account for an on-line first-person shooter could be assigned one profile, while users who create an account for a social networking type environment could be assigned to a different user profile. As another alternative, a set of user-profiles could be generated and a user could be allowed to self-select one with which they most identify. Similarly, user profiles could be generated to represent user responses to a set of preferences.

At step 504, the virtual world application may assign a user to a user profile using based on any of the approaches mentioned above. At step 506, the virtual world application may generate a linguistic profile corresponding to an online environment or a given user profile. The linguistic profile establishes a contextually relevant set of communication terms for users associated with that online environment (or assigned to a common user profile). In one embodiment, a linguistic profile may be created for an online environment based on analysis of chat messages exchanged by users interacting in that online environment (or assigned to a common user profile). Note, chat messages may be analyzed in aggregate, anonymously across groups of users in an online community (or assigned given user profile). Further, a linguistic profile may be generated for each of multiple online environments. A linguistic profile may be based on use of abbreviations, use of full-length expanded phrases, use of capitalization, use of emoticons and other non-word characters, use of punctuation and grammar, word length, word frequency, length of chat messages, and other similar suitable linguistic features observed in the chat communications between users in an online environment (or assigned to a common user group).

At step 508, the virtual world application may determine a mapping between one or more expressions in one linguistic profile to elements in a list of expressions in another linguistic profile. For example, equivalences can be established between abbreviated and non-abbreviated phrases. As illustrated in FIG. 4, e.g., "BTW" (an expression in linguistic profile 410) is noted as being equivalent to "by the way" (an expression in linguistic profile 412). Accordingly, consider a situation where User 1, (associated with user profile 402), chats with User 2 (associated with user profile 404). User 1 may select from a dropdown menu of the chat system the message "BTW," and the chat system instead translates the selected contextual chat term to the corresponding chat phrase, "by the way," when presenting the chat message to User 2.

Figure 6:
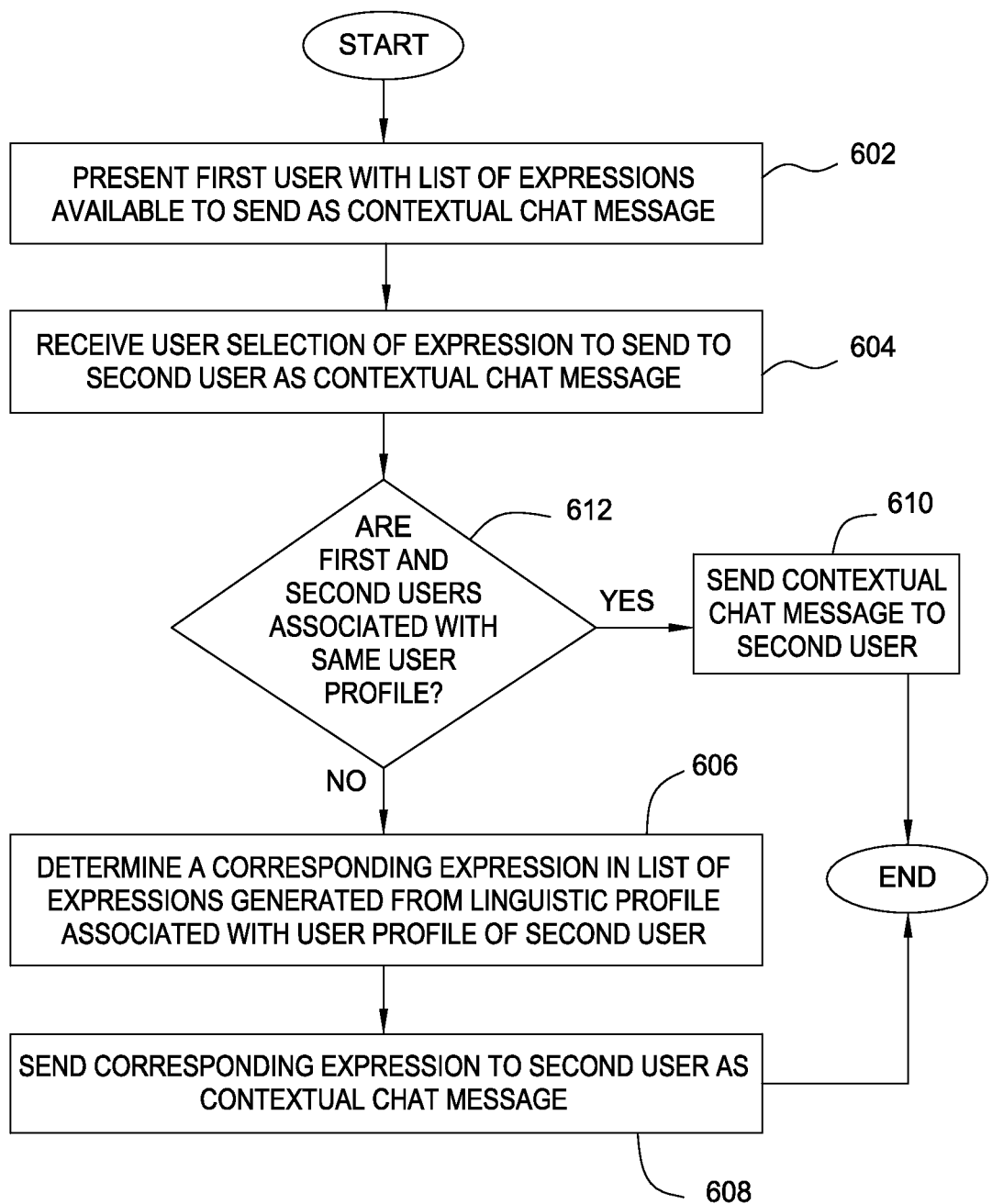
FIG. 6 illustrates a method for providing contextual chat between users in different online environments, according to another embodiment of the invention.

FIG. 6 illustrates a method 600 for providing contextual chat between users in different online environments, according to one embodiment of the invention. As shown, the method 600 begins at step 602, where an application provides a first user in one online environment with a list of predetermined messages that may be sent to a second user as a chat message. As noted above, the list of predetermined messages may be determined by generating a linguistic profile for a group of users (e.g., all users assigned to a certain user profile) that includes the first user and selecting terms from that profile to include in the list.

At step 604, the application may receive a user selection from the list of predetermined expressions. If the first and second users are associated with the same user profile (e.g., both are associated with a profile representing users who primarily play online first-person shooter games), then the user's selection may be passed to the second user as a chat message without any translation (step 610). However, if the first and second users are associated with different user profiles, then the chat message selected by the first user may be translated before being presented to the second user. For example, the second user may be associated with a second online environment (different from the online environment of first user). In such a case, the second online environment may also have a list of expressions generated from a linguistic profile associated with users of the second online environment (or users assigned to a common user profile). Further, a predefined mapping between may be defined for contextual chat messages in the first list of expressions to contextual chat messages in the second list of expressions. Accordingly, at step 606, the application may determine a corresponding expression based on a linguistic profile associated with the second online environment (or common user profile). At step 608, the application may transmit the equivalent expression to the second user. As noted, other items such as audio or visual elements may be used to present the contextual chat message to the second user.

Figure 7:
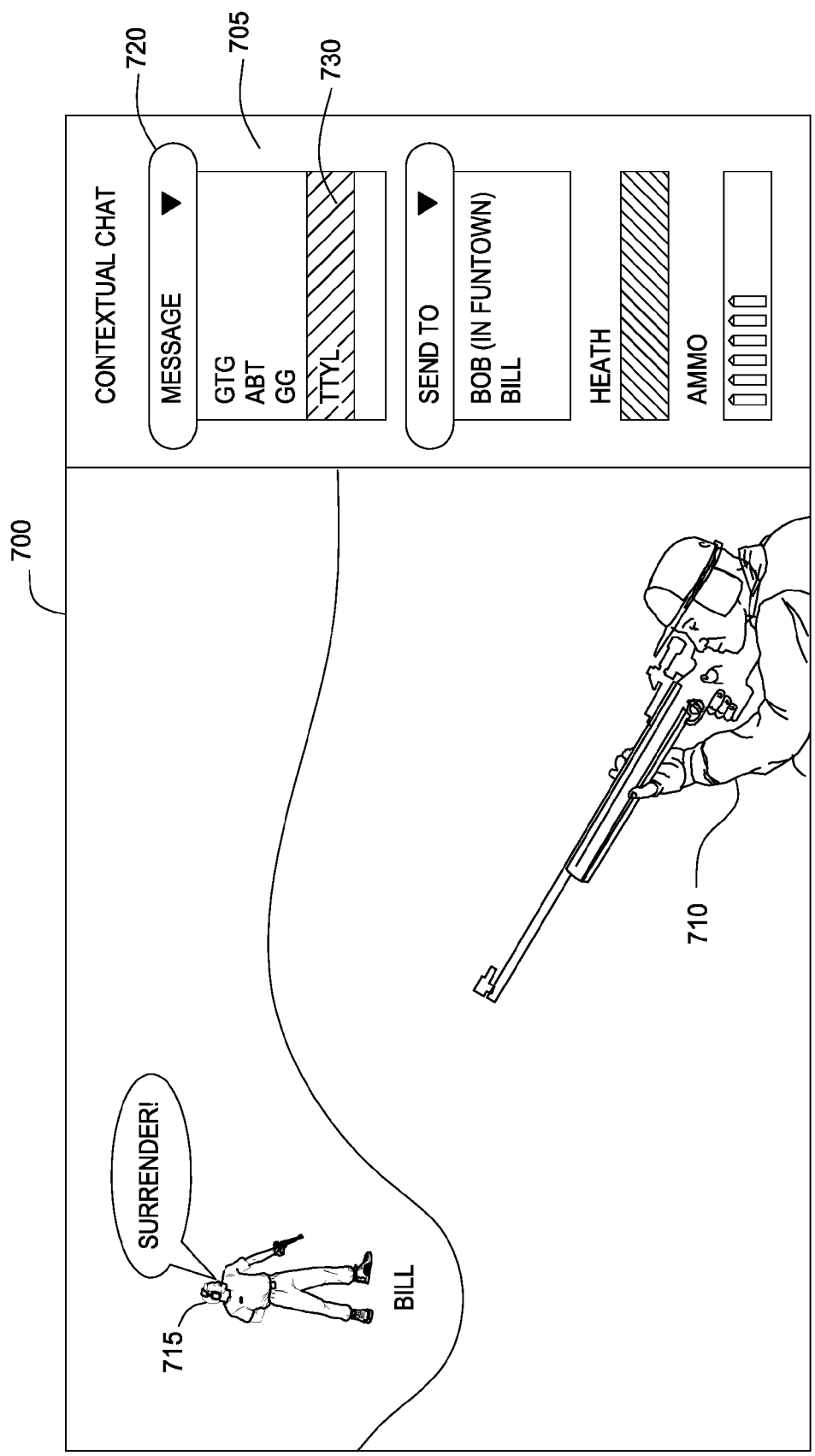
FIG. 7 illustrates a first example graphical interface with a user in an online environment, according to one embodiment of the invention.

FIG. 7 illustrates a first example graphical interface 700 with a user in an on-line environment, according to one embodiment of the invention. In particular, the interface 700 shows a user in an on-line gaming environment. A set of controls may allow a user to control the actions of an avatar 710, e.g., to play the game offered by the online environment. Additionally, chat controls 705 allow the user to exchange chat messages with other users in the online gaming environment depicted in interface 700 as well as with users in other online environments. However, in one embodiment, the content of chat messages the user (controlling avatar 710) can send to other users (e.g., avatar 715) may be limited to a predetermined list of expressions. As described above, e.g., a linguistic profile for a given online environment (or users sharing a common user profile) may be generated by analyzing messages sent among users in the given online environment (or sharing the common user profile). In one embodiment, the list of expressions representing, the most frequently exchanged messages between users of the online environment, may be selected from the linguistic profile as the set of expressions available to send as a chat messages.

As shown in FIG. 7, a panel 720 may be used to select a chat message to be sent from the user controlling avatar 710 to another user within the online gaming environment of interface 700. Illustratively, the user controlling avatar 710 has selected to send a contextual chat message 730 to the other user visible in interface 700 (i.e., to a user with an avatar named "Bill"). In response, the chat client sends the contextual chat message "TTYL" to the user controlling avatar 715. In this example, translating the contextual chat message "TTYL" 730 is unnecessary, as both users are present in the same online environment (and are assumed to share a common user profile). In addition, sending the message "TTYL" to the second user may result in avatar 715 engaging in some visible actions (such as waving goodbye) or in an audible sound effect or recording to be played to the second user.

Figure 8:
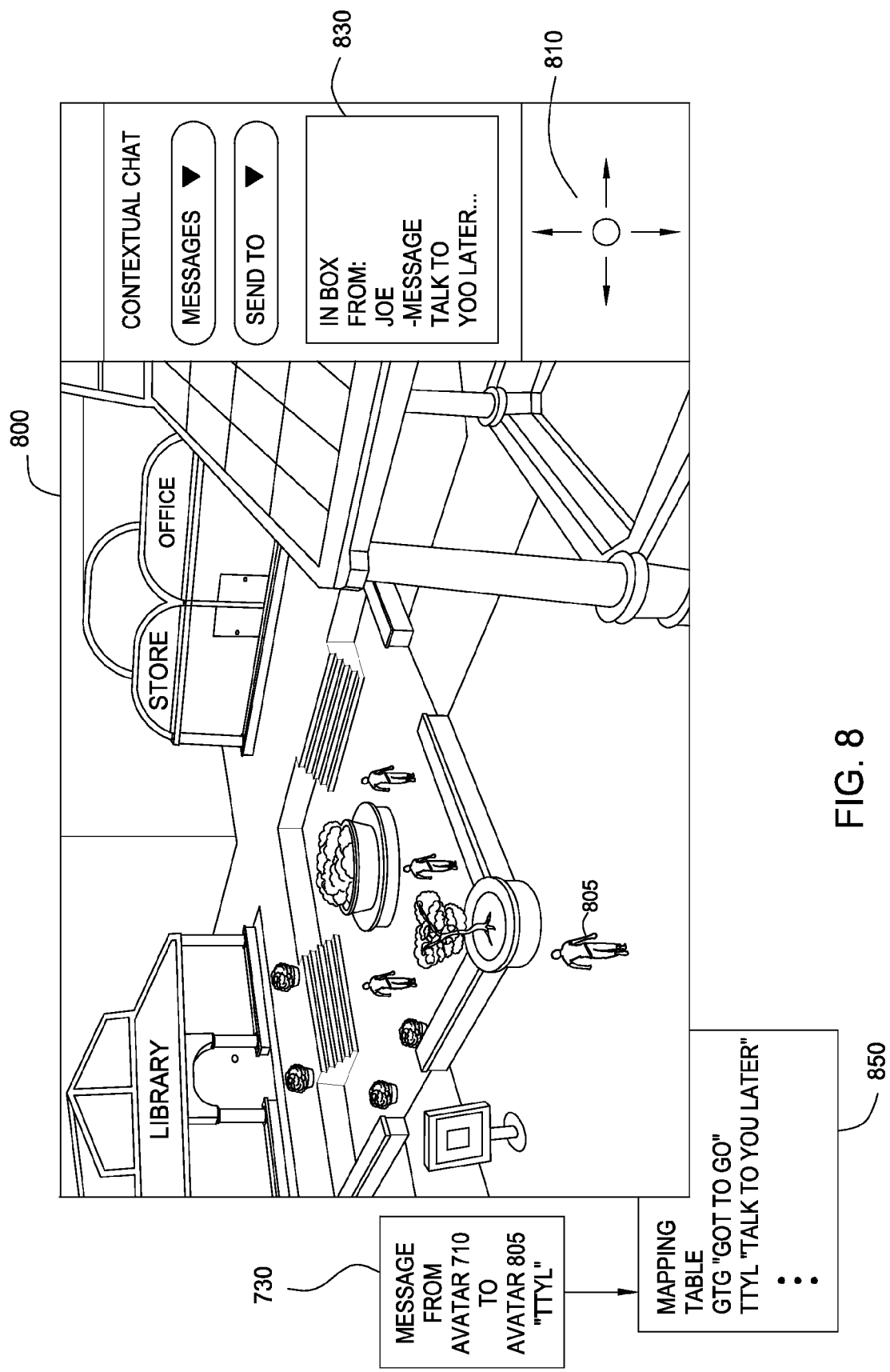
FIG. 8 illustrates a second example graphical interface with a user in an online environment, according to one embodiment of the invention.

However, embodiments of the invention also allow users to send contextual chat messages to users in other online environments. For example, FIG. 8 illustrates a second example graphical interface 800 with a user in a second on-line environment, according to one embodiment of the invention. In particular, the interface 800 shows a user in a social online environment generally configured to allow users to interact with others in a variety of ways. As shown, a user may control avatar 805 using a set of controls 810. In this example, assume the user controlling avatar 710 (of FIG. 7) sends the contextual chat message 730 to the user controlling avatar 805. As noted above, the user controlling avatar 710 may select this message from a list of contextual chat messages 720. However, while users in the first online environment may generally understand the contextual chat message 730—"TTYL"—this message may be foreign to users in the second environment (i.e., the user controlling avatar 805 may be unfamiliar with the semantic meaning of this message). At the same time, users in the second online environment (or sharing a common user profile within the second environment) may also have a linguistic profile generated by monitoring messages exchanged among users of the second environment. Further, in one embodiment, the online server (or chat clients) may store a mapping table 850 used to map contextual chat messages from the list of expressions associated with one linguistic profile to another. For example, FIG. 8 shows a contextual chat message 830 sent by the user controlling avatar 710 in FIG. 7, after it has been translated according to the mapping table 850. In this particular example, the contextual chat message 730 of "TTYL" sent by the user controlling avatar 710 is received by the user controlling avatar 805 having been translated into the full-text phrase "talk to you later." Doing so helps ensure users in different online environments will understand the contextual chat messages sent among one another. Further, as the contextual chat messages are derived from the linguistic profile of a given online environment (or user profile), the list of messages that may be sent may be updated over time. Doing so may promote the use of contextual chat messages both within a given online environment and between users in different online environments.

Figure 9:
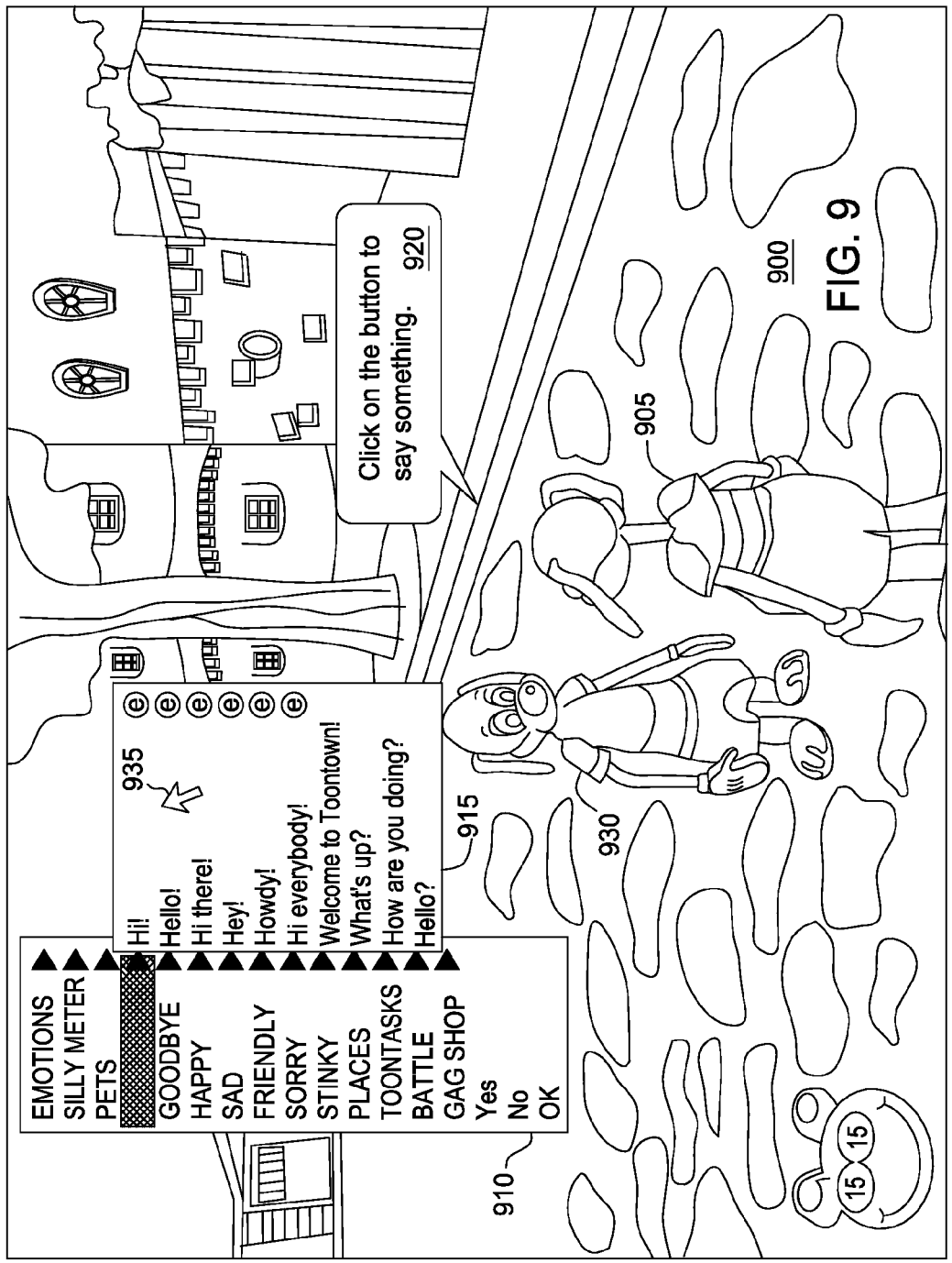
FIG. 9 illustrates an example online environment, according to one embodiment of the invention.

As noted above, an online environment may allow users to send text-based chat messages to one another. And in some cases, a user may be limited to communicating with others using the list of chat messages. Doing so may help provide a safe online environment for younger users, as user-interaction may be limited to the available chat messages (referred to as "safe-chat"). For example, FIG. 9 illustrates an example online environment 900. As shown, a user 905 is presented with a menu of chat topics 910 and list of chat messages 915 available to send to a second user 930. The user 905 is prompted by dialog 920 to select a message to send to the second user. In this example, the user selects a message using mouse cursor 935.

In one embodiment, the online environment 900 may be configured to provide a customized user experience, based on user behavior and collaborative experiences. For example, the popularity of chat messages may change (sometimes rapidly) over time as a given phrase enters the vernacular of a given cohort (e.g., a group of 10-13 year old boys), subsequently becomes popular and then fades in use. Accordingly, updating the contextual chat messages (or safe-chat messages) allows the online environment to follow certain (e.g., cultural or popular) trends. Doing so provides an incentive for users to interact with one another using the safe (or contextual) chat methods.

For example, the online environment 900 may be configured to monitor users interacting with elements of the environment and with other users. Doing so allows common patterns or profiles of user behavior to emerge (and change) over time. In one embodiment, the behavior of many users may be generalized, leading to a group profile sharing a common of attributes. Once a group profile is defined, the use of language by members having the attributes of that group profile may be observed. For example, the content of messages exchanged between users, message word count, word usage frequency, and the popularity of one contextual chat message over another (e.g., "hi" versus "hello" or "hey") may be monitored. And as the way language is used by users associated with the group profile changes, the list of contextual chat messages may be updated to keep pace. When a user engages in behavior that matches the attributes of a group profile, the chat messages presented to that user may updated to help provide a customized user experience.

When a user engages in behavior that matches the attributes of a group profile, the chat messages presented to that user may updated to help provide a customized user experience. Further, in one embodiment, a user may be matched with successive or iterative group profiles (and contextual chat messages) over time. For example, when a user first creates an account, the online environment may match the user to a group profile based on a few basic attributes, e.g., a generic profile corresponding to the on-line environment itself or a new user-selected avatar could indicate gender (resulting in a gender-based iteration of the profile to be associated with that user). Similarly, the user may self-identify certain attributes related to their interests or preferences, resulting it successive iterations of a profile. Based on matching an initial iteration of a profile, some of the contextual chat messages may be tailored to the online user environment (or avatar selection or user preferences, etc.).

However, as the user interacts with other users, and with elements of the online environment, their behavior may match additional attributes of the group profile. In response, the available contextual chat messages may be selected using additional iterations of the group profile. For example, while "Hi!" may generally preferred greeting between users in an online environment, users which match an iteration of the group profile may have a different preferred greeting (e.g., "what up?"). In such a case, the list of chat-messages presented to members matching the iteration of the group profile may be modified to remove "Hi!" or move it from the top position in the list (promoting "what up?" to the primary position). If the user's behavior subsequently matches another iteration of the group profile (or another group profile entirely) then the contextual chat messages may again be updated. This may occur, for example, when a new user joins an online environment or community, begins predominantly interacting with one group of users (matching one iteration of a group profile) and subsequently begins predominantly interacting with another group of users (matching one iteration of a group profile).

Figure 10:
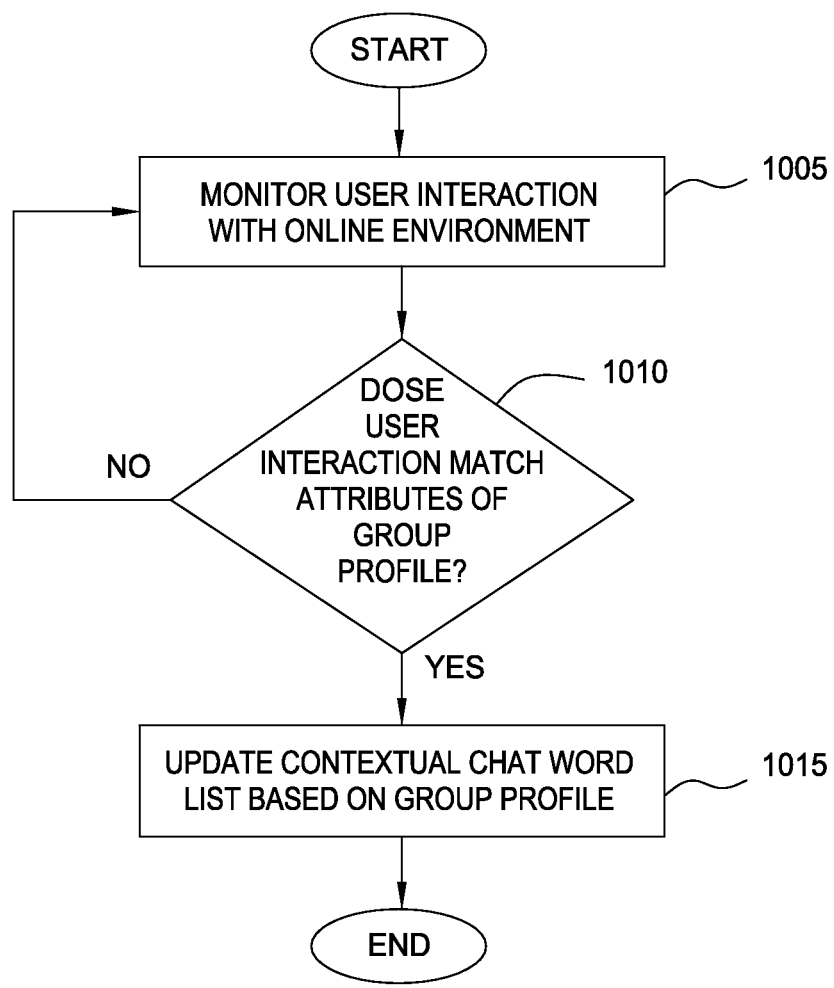
FIG. 10 illustrates a method for providing contextual chat to users of an online environment or community.

FIG. 10 illustrates a method 100 for providing a list of contextual chat messages to users of an online environment or community, according to one embodiment of the invention. As shown, the method begins at step 1005, where the online environment monitors a user interacting with the online environment. For example, the amount of time spent in a particular location (where a group of users tends to congregate), the messages sent between the users, the movement patterns of the user, etc., may all be monitored for a given user and compared to an available set of group profiles. At step 1010, if the user interaction matches the attributes of one of the group profiles (or an iteration of a group profile), then at step 1015, the online environment may update the contextual chat message available for the user based on the matched group profile.

Figure 11:
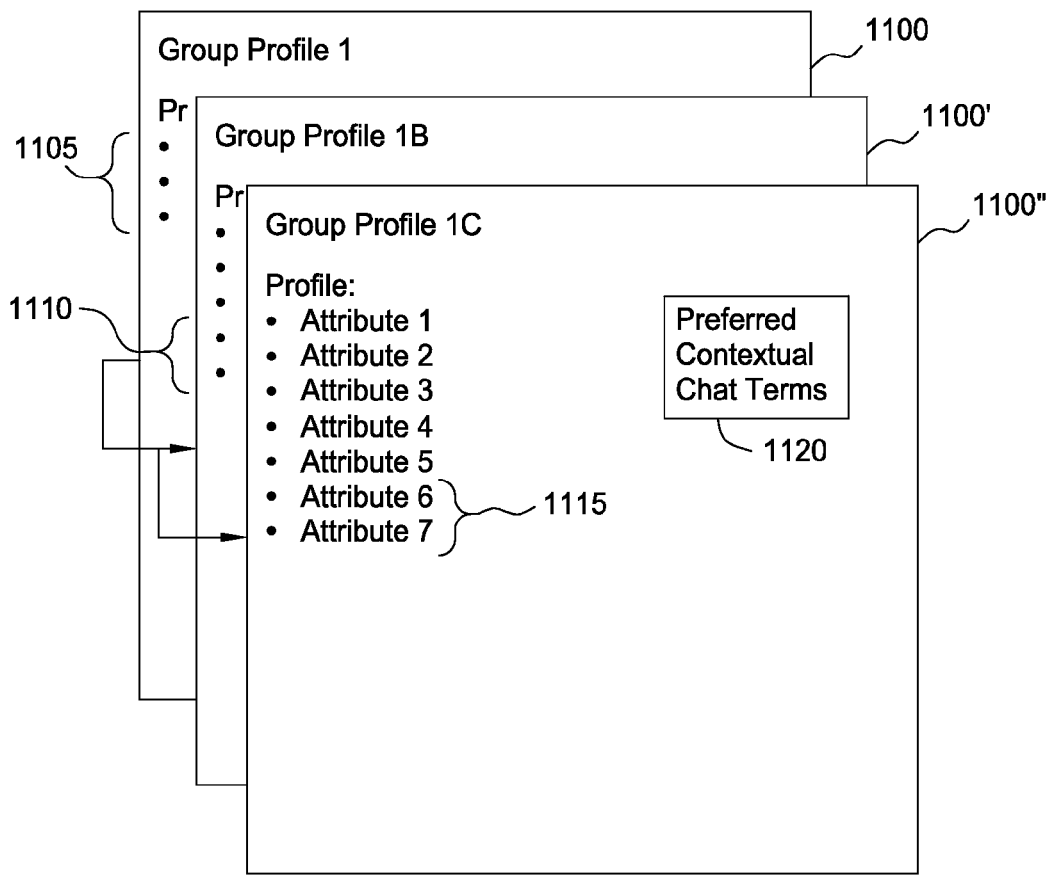
FIG. 11 illustrates an example of a group profile with successively refined iterations, according to one embodiment of the invention.

An example of the method 100 is illustrated by FIG. 11 which shows a group profile with successively refined iterations, according to one embodiment of the invention. In this example, users are associated with iterations of the group profile based on matching a set of one or more attributes at each iteration of the group profile. As shown, a root group profile 1100 (labeled group profile 1) includes a set of attributes 1105 (represented by the three dots in a bullet list). A first iteration 1100' of the group profile 1100 (labeled group profile 1B) adds two additional attributes 1110 to the root profile 1100. That is, the first iteration 1100' of the group profile 1100 includes the first three attributes in the set of attributes 1105 along with two additional attributes 1110. Similarly, a second iteration 1100" of the group profile 1100 (labeled group profile 1C) adds two additional attributes 1115 to group profile 1B 1100'. That is, the second iteration 1100" of the group profile 1100 includes the first three attributes in the set of attributes 1105, the two additional attributes 1110 from the first iteration 1100' of the group profile 1100, and two additional attributes 1115—resulting in a profile that has seven attributes in total. In addition, group profile 1C 1100" shows a preferred set of contextual chat terms 1120. The preferred set of contextual chat terms 1120 provides the list of chat messages presented to users of the online environment. In this example, the group profiles 1100, 1100' and 1100" illustrate a successive refinement of a group profile, where the chat messages become more customized at each of the iterations. For example, the group profile 1100 may represent a basic profile associated with any user who joins a given online environment. As that user engages with the online environment and users in that environment, their behavior may be such that it matches the additional attributes of group profile 1B (and 1C). Thus, as the online environment learns more about a given user, the contextual chat messages may be tailored to provide the user with a customized user experience.

FIG. 12 illustrates the online environment 900 of FIG. 9, in which a user is presented with contextual chat messages based on matching a group profile, according to one embodiment of the invention. In particular, the online environment 900 includes the menu of chat topics 910 and the list of chat messages 915. However, the menu of chat topics 910 has been updated following the user 905 interacting with elements of the environment 900. As shown, the first selection user 905 to greet the user 930 is now "What's up?" and other choices have been reordered, removed, or added to the menu 1200.

Advantageously, embodiments of the invention described above may be used to enhance the user experience of individuals in online environments, particularly across different online environments where users have distinct conventions for chatting. For example, a contextual chat feature may be used to present users with a list of words, phrases, abbreviations or symbols that may be sent to other users within one online environment. The list of messages may be derived from a linguistic profile which itself may change as the use of language in an online environment (or by a particular user group) evolves, over time. Further, as the online environment learns more about a given user, the contextual chat messages may be tailored to provide the user with a customized user experience.

In cases where a user sends messages to another user in the same online environment, messages may be sent without being altered. However, when a user selects a chat message from the list to send to a user in another online environment, the message may be translated based on a linguistic profile associated with the user in the second environment.

While the foregoing is directed to embodiments of the present invention, other and further embodiments of the invention may be devised without departing from the basic scope thereof, and the scope thereof is determined by the claims that follow.

What is claimed is:

1. A computer-implemented method for facilitating communication between users in an online virtual environment, comprising:
   generating a first list of expressions based on a first linguistic profile associated with a first plurality of users, wherein the first plurality of users communicate within a first online environment in a first language;
   generating a second list of expressions based on a second linguistic profile associated with a second plurality of users, wherein the second plurality of users communicate within a second online environment in the first language;
   determining a mapping from one or more entries in the first list of expressions to corresponding one or more entries in the second list of expressions;
   updating the first linguistic profile based on an analysis of user-to-user communications between the first plurality of users; and
   updating the first list of expressions based on the updated first linguistic profile.

2. The computer-implemented method of claim 1, further comprising:
   modifying a chat message sent from a first user of the first plurality of users to a second user of the second plurality of users based on the determined mappings.

3. The computer-implemented method of claim 2, wherein the modified chat message comprises one of the entries from the first list of expressions mapped to the corresponding entry in the second list of expressions.

4. The computer-implemented method of claim 1, wherein at least one entry in the first list of expressions comprises an abbreviation of a phrase used by the first plurality of users, and wherein the corresponding entry in the second list of expressions comprises a full-length representation of the phrase.

5. The computer-implemented method of claim 1, wherein the first and second the linguistic profiles are generated based on an evaluation of the respective first and second plurality of users use of at least one of: abbreviations, full-length phrases, capitalization, symbols, punctuation, grammar, word length, word frequency, and message frequency in communicating with other users of the respective first and second plurality of users.

6. The computer-implemented method of claim 1, wherein at least a first entry of the corresponding one or more entries in the second list of expressions is associated with an audio or visual element when presented to a recipient as a contextual chat message.

7. A non-transitory computer-readable storage medium storing a program, which, when executed by a processor performs an operation for facilitating communication between users in an online virtual environment, the operation comprising:
   generating a first list of expressions based on a first linguistic profile associated with a first plurality of users, wherein the first plurality of users communicate within a first online environment in a first language;
   generating a second list of expressions based on a second linguistic profile associated with a second plurality of users, wherein the second plurality of users communicate within a second online environment in the first language;
   determining a mapping from one or more entries in the first list of expressions to corresponding one or more entries in the second list of expressions;
   updating the first linguistic profile based on an analysis of user-to-user communications between the first plurality of users; and
   updating the first list of expressions based on the updated first linguistic profile.

8. The computer-readable storage medium of claim 7, wherein the operation further comprises:
   modifying a chat message sent from a first user of the first plurality of users to a second user of the second plurality of users based on the determined mappings.

9. The computer-readable storage medium of claim 8, wherein the modified chat message comprises one of the entries from the first list of expressions mapped to the corresponding entry in the second list of expressions.

10. The computer-readable storage medium of claim 7, wherein at least one entry in the first list of expressions comprises an abbreviation of a phrase used by the first plurality of users, and wherein the corresponding entry in the second list of expressions comprises a full-length representation of the phrase.

11. The computer-readable storage medium of claim 7, wherein the first and second the linguistic profiles are generated based on an evaluation of the respective first and second plurality of users use of at least one of: abbreviations, full-length phrases, capitalization, symbols, punctuation, grammar, word length, word frequency, and message frequency in communicating with other users of the respective first and second plurality of users.

12. The computer-readable storage medium of claim 7, wherein at least a first entry of the corresponding one or more entries in the second list of expressions is associated with an audio or visual element when presented to a recipient as a contextual chat message.

13. A system, comprising:
a processor; and
a memory, wherein the memory includes an application program configured to perform an operation for facilitating communication between users in an online virtual environment, the operation comprising:
generating a first list of expressions based on a first linguistic profile associated with a first plurality of users, wherein the first plurality of users communicate within a first online environment in a first language,
generating a second list of expressions based on a second linguistic profile associated with a second plurality of users, wherein the second plurality of users communicate within a second online environment in the first language,
determining a mapping from one or more entries in the first list of expressions to corresponding one or more entries in the second list of expressions,
updating the first linguistic profile based on an analysis of user-to-user communications between the first plurality of users, and
updating the first list of expressions based on the updated first linguistic profile.

14. The system of claim 13, wherein the operation further comprises:
modifying a chat message sent from a first user of the first plurality of users to a second user of the second plurality of users based on the determined mappings.

15. The system of claim 14, wherein the modified chat message comprises one of the entries from the first list of expressions mapped to the corresponding entry in the second list of expressions.

16. The system of claim 13, wherein at least one entry in the first list of expressions comprises an abbreviation of a phrase used by the first plurality of users, and wherein the corresponding entry in the second list of expressions comprises a full-length representation of the phrase.

17. The system of claim 13, wherein the first and second the linguistic profiles are generated based on an evaluation of the respective first and second plurality of users use of at least one of: abbreviations, full-length phrases, capitalization, symbols, punctuation, grammar, word length, word frequency, and message frequency in communicating with other users of the respective first and second plurality of users.

18. The system of claim 13, wherein at least a first entry of the corresponding one or more entries in the second list of expressions is associated with an audio or visual element when presented to a recipient as a contextual chat message.

19. A computer-implemented method for providing a chat feature in an online virtual environment, comprising:
providing a first user with a list of predetermined expressions based on a first linguistic profile;
receiving a selection from the first user of an entry form the first list of predetermined expressions and an indication of a second user as a chat message recipient, wherein the first user is one of a first plurality of users communicating within a first online environment in a first language, and wherein the second user is one of a second plurality of users within a second online environment in the first language;
upon determining the first and second user are associated with a common user profile, transmitting the selected entry as a chat message to the second user; and
upon determining the first and second user are associated with different user profiles:
determining a corresponding entry in a second list of expressions, wherein the second list of expressions is based on a second linguistic profile, and
transmitting the corresponding entry to the second user as a contextual chat message;
updating the first linguistic profile based on an analysis of user-to-user communications between the first plurality of users within a first online environment; and
updating the first list of expressions based on the updated first linguistic profile.

20. The computer-implemented method of claim 19, wherein the entry selected from the first list of expressions comprises an abbreviation of a phrase used by a first plurality of users associated with the first linguistic profile, and wherein the corresponding entry in the second list of expressions comprises a full-length representation of the phrase.

21. The computer-implemented method of claim 19, wherein the entry selected from the first list of expressions comprises a phrase used by a first plurality of users associated with the first linguistic profile, and wherein the corresponding entry in the second list of expressions comprises an abbreviated representation of the phrase.

22. The computer-implemented method of claim 19, wherein the corresponding entry in the second list of expressions is associated with one or more audio or visual elements to be presented to the second user as part of the contextual chat message.

* * * * *